Jan. 31, 1939.  W. D. HERGERT  2,145,393
FROZEN FOOD PRODUCT AND METHOD OF ICE GLAZING SAME
Filed March 12, 1938
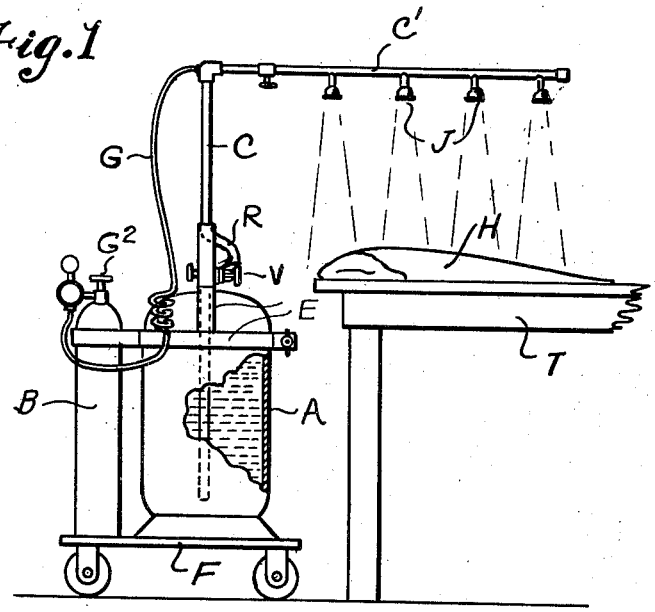
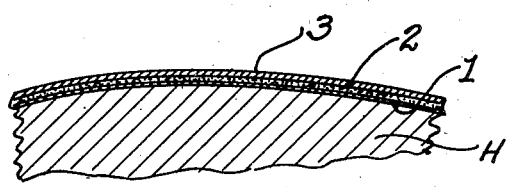
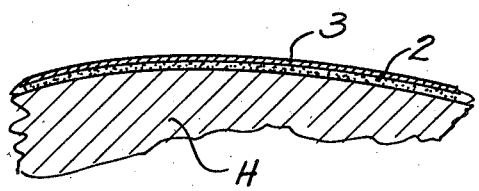
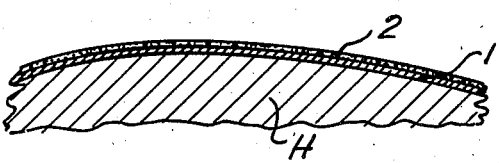
INVENTOR
W. D. HERGERT
BY
Cook & Robinson
ATTORNEYS Patented Jan. 31, 1939

2,145,393

UNITED STATES PATENT OFFICE 2,145,393

FROZEN FOOD PRODUCT AND METHOD OF ICE GLAZING SAME

Winfield D. Hergert, Seattle, Wash., assignor to San Juan Fishing and Packing Company, Seattle, Wash., a corporation of Washington Application March 12, 1938, Serial No. 195,639

3 Claims. (Cl. 99—192)

This invention relates to food products and to improvements in the methods of ice glazing frozen food products of various kinds; the invention being more particularly applicable to the ice glazing of fish.

For the purpose of imparting a better understanding to the present invention, it will be here explained that it is now common 'practise, and has been for some time, to freeze freshly caught, butchered fish, and to maintain them in storage, frozen at low temperatures until time for shipment to markets for sale and consumption. This freezing of the fish is for the purpose of their preservation whereby to maintain them for an extended period of storage in a salable condition and palatable when used. However, the mere freezing of the fish and its being maintained frozen in storage at low temperature is not all that is necessary to keep the product in a satisfactory and salable condition, for the reason that while the freezing of the flesh retards, it does not stop evaporation of water from the cells of the meat, and even at very low temperatures, dehydration takes place to such extent that a fish will ultimately become dry and unsuitable for use.

Furthermore, changes in the chemical nature of the fish will follow dehydration, causing certain surface discolorations of the meat, which are detrimental to the ready sale of the product. Thus the period of safe storage for the frozen product is reduced to that time during which no dehydration or at least only limited dehydration takes place.

In order that this undesired dehydration of the meat of the frozen fish, as well as discoloration of the flesh, may be prevented, it is a practise now generally followed to dip the fish while frozen at a temperature of from 5° to 10° F., and shortly after freezing, in water at a temperature that is just slightly above freezing temperature; the dipping operation preferably taking place in an atmosphere a few degrees below freezing. The dipping water in such operation, on contacting the surface of the frozen fish, almost instantly freezes thereon and thus forms a thin layer of clear ice glazing over the body of the fish, which glaze may be brought to any desired thickness by repeated dipping.

Fish that have been so glazed then are placed in storage in an atmosphere maintained considerably below freezing temperature so as to maintain the glaze for a maximum period of time. The glaze that is thus given the fish prevents evaporation directly from the meat so long as the glaze is intact. However, evaporation will take place directly from the ice glaze, and this necessitates that it be restored from time to time to insure a continuation of the desired state of preservation of the fish.

It is the common practise in storage plants to renew or maintain the glaze by applying fresh water to the fish while they are maintained in the stacks or storage boxes. So long as the glaze is maintained over the fish, dehydration from the flesh is checked.

When the frozen fish are removed from storage, to be placed in boxes or containers under refrigeration for shipment to various points for sale or consumption, it is usual that they be given a final glaze, thus to seal any cracks that may have been formed in the glaze previously given them, and to cover those parts where the previous glaze may have been broken away. This final glaze will insure the fish against dehydration for another period of time.

The effectiveness of an ice glaze on a fish or frozen food product, whether fish or other frozen foodstuff, is dependent to a certain extent upon the integrity of the glaze; it being understood that cracks in the glaze or pieces chipped away, and also thin spots, are to be avoided as much as possible as they permit dehydration from those areas adjacent the defects.

While preservation of the flesh up to the period of sale is the main reason for the application of the ice glaze and the condition of the fish governs its value, it is also to be considered that the actual sale of the fish, particularly halibut, and other fish having white skin or meat, is influenced to some extent by the appearance of the fish as viewed through the ice glaze. In such fish as halibut and others having white skin or meat, those certain discolorations previously mentioned show up to great disadvantage on the white surface. These discolorations which may have been in the fish in its live state, or which may have appeared during the time of storage, and which may be in various shades of yellow or red, or mixtures of these colors, while not harmful when considered from the standpoint of food value or palatability of the fish, may detract from the appetizing appearance of the product.

The ordinary clear ice glazing given a fish, being transparent, has a tendency, if anything, to magnify the discolorations and in some instances, certain liquids have been used in the dip water to make it rather opaque in order that such discolorations might be made less conspicuous.

In view of statements in the foregoing paragraphs it has been the principal object of this invention to provide a novel method of glazing frozen products, particularly frozen fish, whereby to form a glaze that is long lasting and exceedingly resistant to cracking and chipping. It is also an object to provide a glaze that enhances the appearance of fish on display by reason of the white and attractive appearance of the glaze.

More specifically stated, it is an object of this invention to provide a method of ice glazing for frozen fish that insures a less brittle and longer lasting glaze and one that is white or opaque, as distinguished from transparent, thereby having the additional advantages of overcoming detraction by reason of discolorations which might appear on the product.

It is also an object of this invention to provide a method of glazing which contemplates and provides for the formation of a glaze that is of porous or frosty nature. Furthermore to provide for the use of such a porous glaze with the ordinary clear ice glaze, thereby to provide a sealing glaze that has certain elasticity that makes it longer lasting than the usual ice glaze, without loss of any of the protective properties of the clear ice glaze. It is a still further object to provide a method of ice glazing that has a sterilizing action on the product to which the glaze is applied.

Other objects of the invention reside in the steps and in their sequence as followed in the present method, and in the means provided for practising the method, as will hereinafter be explained and set forth in claims terminating the specification.

To impart a better understanding to the invention, I have provided the accompanying drawing, wherein—

Fig. 1 shows, in elevation, a means for applying a gas charged water to the frozen product to produce the ice glaze.

Figs. 2, 3 and 4 are sectional views illustrating the different ice layers in the ice glaze.

Rather broadly stated, the present invention contemplates a method of ice glazing frozen fish and other frozen food products, and it further contemplates the application of the present ice glaze, either as an initial glaze to be covered by the usual solid ice glaze, or as a supplemental glaze to be applied over the initial solid ice glaze, or between an initial and final solid ice glaze.

The present method further contemplates the charging of a supply of fresh clear water with a suitable gas at high pressure, and the confining of this charged water in a cool room for a period of time sufficient for absorption by the water of the maximum amount of the gas; finally it contemplates the spraying of this charged water in finely atomized condition over the frozen fish or food product to form an ice glaze which, by reason of the escapement of the gas from the water as it freezes on the surface of the fish, will be rendered exceedingly porous, thus making it white or opaque in appearance, as differentiated from being solid and transparent. The porous glaze, either when underlying or when covered with a solid ice glaze or between layers of solid ice glaze, will provide a protective glaze over the fish that is exceedingly tough, practically non-cracking by reason of added elasticity, and perfectly white in appearance.

It will here be stated that the purpose of charging the water with a gas is to effect the porous, foamy condition of the glaze, which is the result of the gas being given off from the atomized water incident to the water freezing on the surface of the fish. In this case, I prefer to use carbon dioxide gas ($CO_2$) to change the water but I do not wish to be confined in any way to this gas, which has been selected as preferred because of the fact that it has no detrimental or unsuitable effects on the water or foodstuff and has certain sterilizing action later explained. Certain other gases, such as sulphur dioxide ($SO_2$), hydrogen sulfide ($H_2S$), chlorine ($Cl_2$), air, carbon monoxide ($CO$), acetylene ($C_2H_2$), hydrogen chloride ($HCl$), might be employed with a like degree of success from the standpoint of the ice glazing, but are not so desirable because of odor.

In carrying out the present method, I have taken into consideration the fact that water absorbs proportionately greater quantities of gas as the temperature of the water is lowered, and that the absorbed gas is given off instantly from the water when it freezes. Gas thus liberated from freezing water leaves the ice in a porous or frost-like condition, and in this instance, it is that condition which accounts for the property of elasticity in the glaze, the added strength, the resistance to cracking and the whiteness of the glaze formed by the charged water.

In carrying out the present process, a quantity of cold water is charged with a gas, preferably carbon dioxide gas ($CO_2$), admitted thereto at a pressure of preferably from 200 to 250 pounds per square inch. This charging of the water may be accomplished by admitting the gas from a container to the water, confined in the ordinary type of soda fountain tank, or other suitable tank. A tank of charged water is then placed in a cooler. Preferably the charged tank will be maintained at a temperature of 32° F., for at least 24 hours. This causes the temperature of the gas charged water to be lowered to 32° F. and also allows the water to absorb the maximum amount of gas in accordance with the pressure.

The fish to be glazed with the above charged solution, after having previously been frozen and stored in a freezing temperature, are laid out in a single layer on a suitable table in a room that would be maintained at a temperature below freezing. Then the charged water is delivered from the pressure tank through suitable atomizing spray onto the surface of the fish. As the minute particles of chilled gas-charged water strike the surface of the frozen fish, they will freeze, thereby liberating the gas therefrom and effecting the formation on the fish of a layer of porous ice much resembling frost, and having a more elastic property than the ordinary glaze exceedingly white in color. This layer of white ice can be built up to any desired thickness by repeated spraying operations, and when the desired thickness has been attained, it is preferred that the fish then be dipped in clear water at a temperature of 33° which freezes in a smooth glaze over the white ice coating, thus filling the pores in the latter. The final result is a tough and practically crack-proof ice glaze, having the maximum efficiency in sealing the surface against dehydration and having the advantage of removing from external view any discoloration of the fish that might detract from its appetizing and salable appearance.

Ordinarily, the present white ice glaze would be applied over the initial or solid ice glaze on the fish when it is brought from storage for shipment to market. However, such a glaze might be applied initially to the fish when it is placed in storage or at any time during the storage period for the purpose of giving strength, and overcoming tendencies of the storage glaze to crack. It is usual that this porous glaze when applied at the time of shipment is covered with a solid ice glaze by dipping the fish in water.

An additional advantage in this method of ice glazing in the case of using $CO_2$ as the charging gas resides in the sterilizing action on the product that results in the liberation of the carbon dioxide gas as the ice freezes. It is well known that such gas is effective for this purpose and when it is recognized that the water does not instantly freeze, it will be understood that the liberation of gas goes on for some time and thus the sterilizing action as a preventative to bacteria growth has some value.

It will here be mentioned also that the charging of the water with gas under pressure lowers the freezing point of water which has certain advantages. Also that while the present method of charging is satisfactory, it might in some cases be desirable to charge it in other ways, such as by adding carbonates of various metals to the water to charge or carbonate it.

Referring now to the drawing, in which is illustrated a means for carrying out the present method, the fish to be glazed is designated at H, and is shown as being disposed flatly on a table T of suitable height to accommodate the spray device and the workman handling a fish. The spray applying equipment comprises a wheel equipped truck F that may be easily pushed about and on which is mounted a tank A of gas-charged water. Also mounted on the truck and adjacent the tank A, is a tank B, which is referred to as the booster tank and which contains a supply of the selected gas under high pressure. Embracing the two tanks is a band or frame E which holds the tanks in position, and extending upwardly from this frame, and supported thereby, is a pipe C having, at its upper end, a horizontally extending portion C' that is equipped along its length at regular intervals with atomizing spray heads J. These are located in a manner whereby to deliver the spray directly downward. A hose or flexible connection R leads from a control valve V in the top of the tank A to the pipe C, and the admittance of the charged water under pressure to the pipe is thereby placed under control of the valve V; it being understood that when the valve is opened, water will be discharged from the atomizing heads J. There is also a small tube G leading from the top of tank B into the pipe C. This tube is under control of a valve G2 whereby additional pressure may be admitted into the pipe C to insure proper atomization of the charged water when pressure in the tank A is reduced by reason of the lowering of the water supply therein.

With the mechanism so constructed, it is used as follows: First the fish are laid out on the table, then the truck is moved along the table while the charged water is discharged from the spray heads downwardly onto the fish. The adjustment of the pipe C' above the table is such that the water does not freeze before it hits the fish, and the spraying is repeated at intervals in order to build up the desired thickness of the glaze.

It will be understood that with the glazing water at a temperature of 32° and the spraying taking place in an atmosphere of approximately 27° F. and the fish being frozen to a temperature of approximately from 5° to 10° F., the water, on striking the fish, will be instantly frozen, and on freezing, liberates the gas, thus to form the porous, frost-like ice coat.

As soon as the fish are glazed, they are dipped in water at a temperature of just a few degrees above freezing and this forms the clear ice glaze over the white ice glaze.

Fish that are so glazed have a greater commercial value than those otherwise glazed, not only by reason of the fact that the fish have a more attractive appearance, but also because the glaze is longer lasting; the reason for this being that the white glaze is in the nature of a cushion for the outer glaze and gives it the non-cracking qualities that are very desirable.

It is also contemplated that the spray pipe might be fixed more or less in a permanent position and the objects to be glazed passed beneath the sprays on a traveling conveyer.

Figs. 2, 3 and 4 of the drawing are sectional details illustrating the use of the present porous ice glaze in various ways with the usual solid ice glaze. Fig. 2 shows at H the frozen body of the fish on which is a solid ice glaze 1 and upon which is applied a porous ice glaze 2, made according to this invention and this, in turn, has a final glaze of solid ice 3.

Fig. 3 illustrates a porous glaze 2 as an initial glaze, which is covered by a solid ice glaze 3, and in Fig. 4 is shown the fish having the initial glaze 1 and porous glaze 2.

While temperatures of the product and of the atmosphere in which glazing is carried on may vary to some extent, the temperatures and conditions mentioned have been found most practical. However, it is desired that the claims be considered as anticipating variation in temperatures or conditions within reasonable ranges and that they be given an interpretation that is commensurate with the invention disclosed.

In the following claims, the use of the term "porous ice" is intended to designate that type of glaze that is formed by the present method, whether or not it be merely a porous glaze or a glaze of a frosty or foamy-like nature; also to designate a water ice glaze that is given a white appearance by reason of the liberation of gas from the water as it freezes on the surface of the frozen fish.

Having thus described my invention, what I claim as new therein and desire to secure by Letters Patent is—

1. The method of applying an ice glaze to frozen food products which comprises delivering a spray of water, charged with carbon dioxide gas onto the frozen product thereby to cause the spray to freeze in a porous layer of ice and the gas to be liberated as a sterilizing agent.

2. A frozen food product having a protective glazing of ice; said glazing comprising a plurality of superimposed layers, at least one of which is porous, to give whiteness to the glaze.

3. A frozen food product comprising a piece of meat having a white surface, and a protective glazing of ice applied thereto and comprising a plurality of superimposed layers at least one of which is white and porous to enhance the appearance of the said white surface, and at least one is solid ice.

WINFIELD D. HERGERT.